United States Patent
Henry et al.

(10) Patent No.: US 7,313,658 B2
(45) Date of Patent: Dec. 25, 2007

(54) MICROPROCESSOR AND METHOD FOR UTILIZING DISPARITY BETWEEN BUS CLOCK AND CORE CLOCK FREQUENCIES TO PRIORITIZE CACHE LINE FILL BUS ACCESS REQUESTS

(75) Inventors: G. Glenn Henry, Austin, TX (US); Rodney E. Hooker, Austin, TX (US)

(73) Assignee: VIA Technologies, Inc. (TW)

( * ) Notice: Subject to any disclaimer, the term of this patent is extended or adjusted under 35 U.S.C. 154(b) by 331 days.

(21) Appl. No.: 11/225,865

(22) Filed: Sep. 13, 2005

(65) Prior Publication Data

US 2006/0031640 A1   Feb. 9, 2006

Related U.S. Application Data

(63) Continuation-in-part of application No. 10/274,842, filed on Oct. 18, 2002, now Pat. No. 6,985,999.

(60) Provisional application No. 60/345,458, filed on Oct. 23, 2001.

(51) Int. Cl.
*G06F 12/08* (2006.01)

(52) U.S. Cl. ................ 711/152; 711/118; 711/167

(58) Field of Classification Search .............. 711/118, 711/152, 169, 167; 710/52, 56; 713/501
See application file for complete search history.

(56) References Cited

U.S. PATENT DOCUMENTS

| | | | |
|---|---|---|---|
| 5,333,296 A | 7/1994 | Bouchard et al. | |
| 5,694,553 A | 12/1997 | Abramson et al. | |
| 5,812,799 A * | 9/1998 | Zuravleff et al. | 710/52 |
| 5,815,693 A * | 9/1998 | McDermott et al. | 713/501 |
| 5,860,158 A | 1/1999 | Pai et al. | |
| 6,009,533 A * | 12/1999 | Zick | 713/501 |
| 6,026,459 A | 2/2000 | Huppenthal | |
| 6,148,372 A | 11/2000 | Mehrotra et al. | |
| 6,311,285 B1 | 10/2001 | Rodriguez et al. | |

\* cited by examiner

*Primary Examiner*—Pierre-Michel Bataille
(74) *Attorney, Agent, or Firm*—E. Alan Davis; James W. Huffman

(57) ABSTRACT

A microprocessor prioritizing cache line fill requests according to request type rather than issuing the requests in program order is disclosed. The requests are generated within the microprocessor at a core clock frequency, which is a multiple of the clock frequency of a bus coupling the microprocessor to a system memory from which the requests are satisfied. The request types are a blocking type and one or more non-blocking types. Blocking requests are initially assigned a higher priority than non-blocking requests. Once per bus clock, the highest priority request is selected for issuance on the bus, and the priority of each of the non-selected requests is increased. If more than one request is highest priority, the highest priority requests are selected in round-robin order. A request may have its priority changed if an event occurs which affects its type.

45 Claims, 6 Drawing Sheets

Microprocessor Operation

Microprocessor

Control Logic

*Microprocessor Operation*

MICROPROCESSOR AND METHOD FOR UTILIZING DISPARITY BETWEEN BUS CLOCK AND CORE CLOCK FREQUENCIES TO PRIORITIZE CACHE LINE FILL BUS ACCESS REQUESTS

This application is a continuation-in-part of U.S. Non-Provisional application Ser. No. 10/274,842, filed Oct. 18, 2002, U.S. Pat. No. 6,985,999, patented Jan. 10, 2006, entitled MICROPROCESSOR AND METHOD FOR UTILIZING DISPARITY BETWEEN BUS CLOCK AND CORE CLOCK FREQUENCIES TO PRIORITIZE CACHE LINE FILL BUS ACCESS REQUESTS, which is incorporated by reference herein in its entirety, and which claims priority to U.S. Provisional Application Ser. No. 60/345,458, filed Oct. 23, 2001, entitled CONTINUOUS FILL PRIORITIZATION.

FIELD OF THE INVENTION

This invention relates in general to the field of cache memories in microprocessors, and particularly cache memories in microprocessors having disparate core clock and bus clock frequencies.

BACKGROUND OF THE INVENTION

Contemporary computer systems commonly include a microprocessor. The microprocessor is coupled to the other components of the system by a processor bus and the microprocessor communicates with the other devices over the processor bus, such as by transferring data.

Typically, the processor bus operates at one clock frequency, and the circuitry inside the microprocessor operates internally at a much higher clock frequency. The internal microprocessor clock frequency is commonly referred to as the core clock frequency. For example, the processor bus clock frequency may be 100 MHz, whereas the core clock frequency may be 1 GHz.

It is common for the core clock frequency to be a multiple of the bus clock frequency. In the example above, the multiple, or clock multiplier, is 10. It is also common for the multiple to be a fraction, such as 15/2. Regardless of their values, the core clock frequency is typically an order of magnitude greater than the bus clock frequency. The clock multiplier may be programmed into the microprocessor during manufacture, or may be programmable.

Microprocessors typically include a cache memory. A cache memory is a relatively small memory inside the processor that stores a subset of the data in the system memory in order to reduce data access time, since accesses to the cache memory are much faster than to the system memory. Caches store data in cache lines. A typical cache line size is 32 bytes, and cache lines are arranged on cache line size memory address boundaries. When an instruction attempts to read or write data, the microprocessor checks first in the cache to see if the cache line implicated by the data address is present in the cache. If so, the instruction reads the data from or writes the data to the cache. Otherwise, the cache generates a bus request to read the data from or write the data to system memory on the processor bus.

Although the microprocessor may internally generate one or more bus requests each core clock cycle, the microprocessor can only issue one bus request on the external processor bus each bus clock cycle. Hence, during a bus clock cycle the microprocessor may internally generate many requests, depending upon the instruction sequence and the clock multiplier value. However, the microprocessor can only issue on the processor bus one of the many bus requests each bus clock cycle. The remaining bus requests must wait until the next bus clock cycle at which time the microprocessor can issue another request.

The conventional approach is to issue internally generated requests on the processor bus in program order, that is, in the order the program executing on the microprocessor generates the requests. However, the conventional approach fails to recognize that the order in which the program generates bus requests may be different from the order of urgency of the pending requests. That is, the data missing in the cache associated with one bus request may be more urgently needed than the data missing in the cache associated with a different bus request.

Therefore, what is needed is a microprocessor and method for exploiting the disparity between core clock and bus clock frequencies to issue more urgent bus requests before less urgent bus requests.

SUMMARY

The present invention provides a microprocessor that accumulates bus requests generated at core clock rates and prioritizes the bus requests according to the request type and issues the highest priority request at each bus clock. To insure that high priority type bus requests do not starve out lower priority type bus requests indefinitely, each time a pending bus request is passed by in the selection process, its priority is increased, and the requests currently at the highest priority are selected in a round-robin fashion. Finally, the type of a pending bus request—and therefore its priority—may change while it is pending if events occur that affect its type.

In one aspect, the present invention provides a microprocessor, coupled to a bus for coupling to a system memory. The bus operates at a first clock frequency. The microprocessor has core logic operating at a second clock frequency. The second frequency is a multiple of the first frequency. The microprocessor includes a data cache that generates requests at the second frequency to read a cache line from the system memory on the bus. The requests each have a request type from among a plurality of predetermined request types. The request types include a blocking request type and at least one non-blocking request type. The microprocessor also includes control logic, coupled to the data cache, which at the second frequency accumulates the requests and initially assigns a priority to each of the accumulated requests based on the request type. The control logic also, at the first frequency, selects for issuance on the bus a highest priority one of the requests and raises the priority of each of the non-selected accumulated requests. The control logic initially assigns the priority of a blocking type request to a first value and assigns the priority of a non-blocking type request to a second value, wherein the first value is higher priority than the second value.

In another aspect, the present invention provides a method for a microprocessor to request cache lines from a system memory on a bus coupling the microprocessor and system memory. The bus operates at a bus clock frequency and core logic of the microprocessor operates at a core clock frequency which is a multiple of the bus clock frequency. The method includes receiving a plurality of bus requests and initially assigning a priority to each bus request based on a request type thereof at the core clock frequency. The method also includes selecting a highest priority one of the plurality of requests for issuance on the bus, and raising the priority of each of the plurality of requests other than the one of the plurality of requests selected for issuance on the bus, at the bus clock frequency.

In another aspect, the present invention provides a method for a microprocessor to request cache lines from a system memory on a bus coupling the microprocessor and system memory. The bus operates at a bus clock frequency and core logic of the microprocessor operates at a core clock frequency which is a multiple of the bus clock frequency. The method includes receiving a plurality of bus requests and initially assigning a priority to each bus request based on a request type thereof at the core clock frequency. The method also includes determining whether more than one of the plurality of requests is a highest priority at the bus clock frequency. The method also includes if only one of the plurality of requests is the highest priority, selecting the highest priority one of the plurality of requests for issuance on the bus; and, if more than one of the plurality of requests is the highest priority, selecting in a round-robin fashion one of the more than one of the plurality of highest priority requests for issuance on the bus.

An advantage of the present invention is that it takes advantage of the disparity in core and bus logic clock speeds to potentially improve performance by more efficiently using the processor bus and by reducing the clocks per instruction (CPI) of memory access instructions by prioritizing more urgent requests ahead of less urgent requests. Furthermore, by prioritizing bus requests accumulated over an entire bus clock cycle, the present invention achieves more optimal prioritization.

Other features and advantages of the present invention will become apparent upon study of the remaining portions of the specification and drawings.

DETAILED DESCRIPTION

Figure 1:
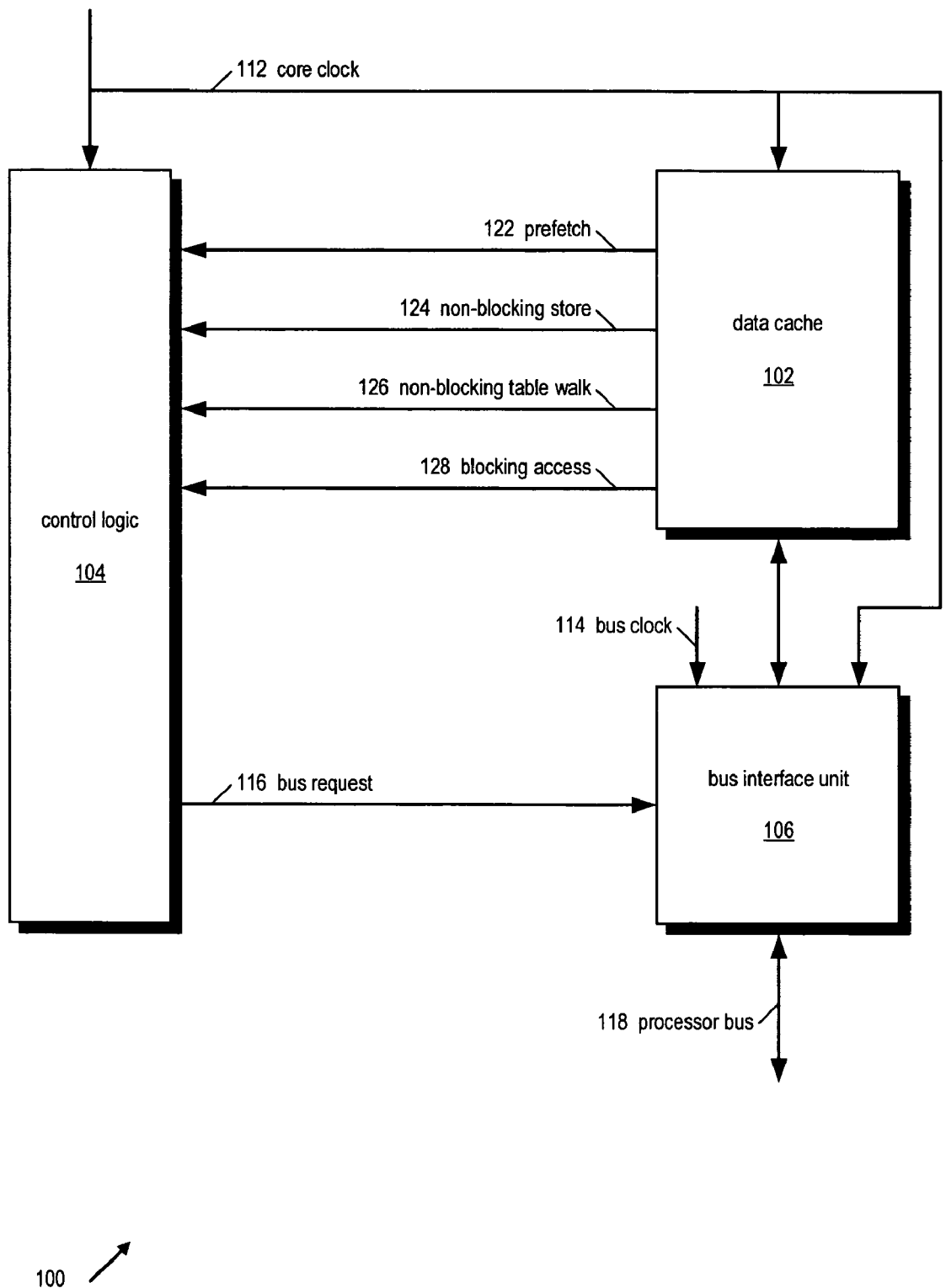
FIG. 1 is a block diagram illustrating a microprocessor 100 according to the present invention.

Referring now to FIG. 1, a block diagram illustrating a microprocessor 100 according to the present invention is shown.

Microprocessor 100 includes a data cache 102. Data cache 102 receives a core clock signal 112 of microprocessor 100. Core clock signal 112 is the clock signal driving the core logic of microprocessor 100. Microprocessor 100 also receives a bus clock signal 114. Bus clock signal 114 is the clock signal associated with a processor bus 118 to which microprocessor 100 is coupled. Processor bus 118 couples microprocessor 100 to other devices in the system, such as system memory and I/O devices. The other devices and microprocessor 100 transfer data between one another on processor bus 118. The core clock signal 112 frequency is a multiple of the bus clock signal 114 frequency. In one embodiment, the core clock signal 112 frequency is seven times the bus clock signal 114 frequency. However, other multiples are contemplated, and the present invention is not limited to a particular multiple; furthermore, the core clock signal 112 frequency may be a fractional multiple, rather than an integral multiple, of the bus clock signal 114 frequency, such as seven and one-third, for example.

Data cache 102 comprises arrays of storage elements for storing cache lines and cache tag status associated with the cache lines. Data cache 102 receives from various functional units within microprocessor 100 requests to transfer data to or from data cache 102. The data transfer requests include a memory address. If the cache line containing the data specified by the memory address is present in data cache 102, then data cache 102 transfers the data to or from the requesting functional unit. However, if the cache line containing the specified data is not present in data cache 102, then data cache 102 generates requests to obtain the missing cache line from system memory. The requests to obtain a cache line from system memory are also referred to as a cache line fill or a cache line allocation. In the embodiment of FIG. 1, data cache 102 generates four types of cache line fill requests to obtain missing cache lines from system memory. The data cache 102 generates the requests at the core clock signal 112 frequency.

A first request type is a blocking access type. Data cache 102 generates a blocking access type request on blocking access signal 128. Data cache 102 generates a blocking access type request 128 when the functional unit requesting the data transfer will stall until the data is transferred between the data cache 102 and the functional unit. That is, blocking access type requests 128 are associated with a functional unit in microprocessor 100 that require the data specified by the blocking access type request in order to proceed. Examples of blocking access type requests are load and store operations that cause a stall in a pipeline stage of microprocessor 100.

Another example of a blocking access type request is a blocking page table walk request. A page table walk request is generated when a data cache 102 access memory address misses in a translation lookaside buffer (TLB) of microprocessor 100. Page tables contain data needed by the microprocessor 100 paging unit to perform address translation. The page tables are stored in system memory. However, the TLB caches page table data within microprocessor 100. A page table walk request is a request for page table data missing in the TLB. A blocking page table walk request is a page table walk request that causes a stall in the microprocessor 100 pipeline.

A second request type is a non-blocking table walk access type. Data cache 102 generates a non-blocking table walk access type request on non-blocking table walk access signal 126. A non-blocking page table walk request is a page table walk request that is not causing a stall in the microprocessor 100 pipeline. For example, the non-blocking page table walk request may be associated with a speculative page table walk. An example of a speculative page table walk is as follows. Assume a first load instruction misses in data cache 102 causing a blocking access request 128 to be generated. The first load instruction is followed by a second load instruction that hits in data cache 102. However, even though the second load instruction hits data cache 102, i.e., data cache 102 provides the data to the second load instruction, the second load instruction generates a miss in the TLB, which requires a page table walk request. Hence, although the second load instruction is not a blocking request, i.e., the pipeline is not stalled waiting for the data requested by the second load instruction, data cache 102 anticipates a page table walk request that might cause a pipeline stall, and generates a speculative table walk access request while the first load instruction data is being fetched from system memory.

A third request type is a non-blocking store allocation access type. Data cache 102 generates a non-blocking store allocation access type request on non-blocking store allocation access signal 124. Data cache 102 generates a non-blocking store allocation request 124 in relation to a store to a cacheable region of system memory that has a write-back trait. If the store memory address misses in data cache 102, then data cache 102 issues a bus request to read the missing cache line from system memory into data cache 102. When the cache line is read from system memory and stored into data cache 102, then the data associated with the store is written into data cache 102. In particular, the store allocation request, i.e., the request to read the missing cache line from system memory, is not causing a stall in the microprocessor 100 pipeline.

A fourth request type is a non-blocking prefetch access type. Data cache 102 generates a non-blocking prefetch access type request on non-blocking prefetch access signal 122. Data cache 102 generates a non-blocking prefetch request 122 to prefetch from system memory a cache line specified by a prefetch instruction or speculative prefetch generated by microprocessor 100.

Microprocessor 100 also includes control logic 104 coupled to data cache 102. Control logic 104 receives core clock signal 112. Control logic 104 also receives non-blocking prefetch access signal 122, non-blocking store allocation access signal 124, non-blocking table walk access signal 126, and blocking access signal 128 from data cache 102 according to the core clock signal 112. Control logic 104 generates a bus request signal 116 to request generation of a transaction on processor bus 118 to obtain cache lines from system memory in response to cache line fill request signals 122-128. Advantageously, control logic 104 accumulates requests generated on request signals 122-128 over a period, or cycle, of bus clock 114, assigns an initial priority to the accumulated requests based on a request type of each request, and generates bus request signal 116 based on the highest priority request just prior to the next bus clock 114, as described in more detail below, rather than simply generating bus requests 116 in program order as in the conventional method. Furthermore, advantageously each time the control logic 104 selects the highest priority request, it also elevates the priority of each non-selected request to insure that no request is passed over indefinitely. Still further, advantageously, if there are multiple requests at the highest priority, the control logic 104 selects one of them in round-robin order to further insure that no request is passed over indefinitely. Although control logic 104 and data cache 102 are shown in FIG. 1 as distinct entities, control logic 104 may be incorporated into data cache 102.

Microprocessor 100 also includes a bus interface unit (BIU) 106 coupled to data cache 102 and control logic 104. BIU 106 receives bus request signal 116 from control logic 104. BIU 106 is coupled to processor bus 118. BIU 106 arbitrates for access to processor bus 118 and generates bus transactions on processor bus 118 to transfer data between microprocessor 100 and the other system devices, such as system memory. In particular, BIU 106 generates bus transactions on processor bus 118 to fetch cache lines from system memory based on bus request signal 116. BIU 106 also receives core clock signal 112 and bus clock signal 114.

Figure 2:
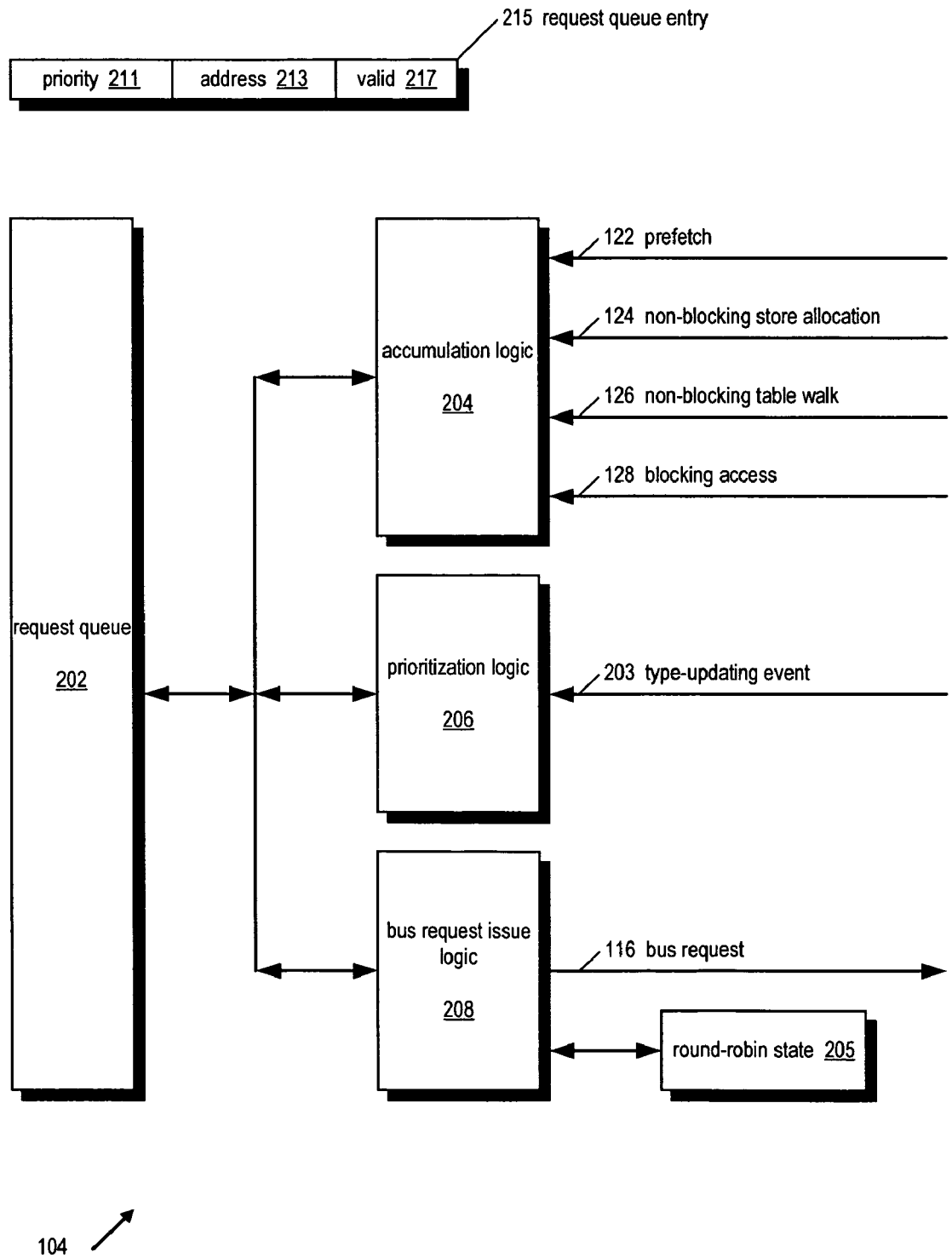
FIG. 2 is a block diagram illustrating the control logic of FIG. 1 according to the present invention.

Referring now to FIG. 2, a block diagram illustrating control logic 104 of FIG. 1 is shown. Control logic 104 includes a request queue 202. Request queue 202 stores requests 122-128 received from data cache 102 of FIG. 1. The request queue 202 comprises a plurality of entries 215 for storing the requests, as shown in FIG. 2. Each request entry 215 includes storage space for storing a priority 211 of the request and the memory address 213 specified by the request. Additionally, each entry 215 includes a valid bit 217 for indicating whether the entry 215 contains a valid request. In one embodiment, the priority 211 comprises four bits which enable each request 215 to have one of sixteen possible priority 211 values. In one embodiment, a value of Boolean 4'b0000 is lowest priority and a value of Boolean 4'b1111 is highest priority. In one embodiment, a value of Boolean 4'b1111 is lowest priority and a value of Boolean 4'b0000 is highest priority.

Control logic 104 also includes accumulation logic 204 coupled to request queue 202. Accumulation logic 204 receives cache line fill request signals 122-128 from data cache 102. In one embodiment, accumulation logic 204 stores cache line fill requests received on request signals 122-128 in request queue 202 in the order received. However, in another embodiment, although the request queue 202 is referred to as a queue, the request queue 202 does not necessarily function as a first-in-first-out structure; rather, the request queue 202 functions as a random access structure. That is, the accumulation logic 204 stores the requests 122-128 into the first available entry 215 in the request queue 202. Similarly, the requests 122-128 are not necessarily removed from the request queue 202 in the order in which they enter the request queue 202.

As the accumulation logic 204 stores a request into a request queue 202 entry 215, it assigns an initial priority to the request 215 in the entry priority field 211 based on the request type of the request. In one embodiment, the accumulation logic 204 assigns the initial priority 211 as shown in Table 1 below. In the embodiment of Table 1, a larger binary priority value corresponds to a higher priority and a smaller binary priority value corresponds to a lower priority; thus, 4'b1111 (decimal 15) is the highest possible priority value and 4'b0000 (decimal 0) is the lowest possible priority value. In another embodiment, the opposite is true, i.e., 4'b1111 is the lowest possible priority value and 4'b0000 is the highest possible priority value.

TABLE 1

| Request Type | Initial Priority |
| --- | --- |
| blocking access | 4'b1100 (decimal 12) |
| non-blocking table walk access | 4'b0111 (decimal 7) |
| non-blocking store allocation or prefetch access | 4'b0000 (decimal 0) |

Control logic 104 also includes prioritization logic 206 coupled to request queue 202. Prioritization logic 206 receives a type-updating event signals 203 that indicate an event has occurred within the microprocessor 100 that changes the request type of a request 215 stored in the request queue 202. For example, a prefetch instruction may be executed causing a prefetch type request 215 to be accumulated into the request queue 202. Subsequently, a load instruction from the same cache line specified in the prefetch request 215 may miss in the data cache 102 causing a pipeline stall until the missing data is returned. Consequently, the type-updating event signals 203 will indicate the address of the missing cache line and will indicate that the address is associated with a blocking request.

In response to the type-updating event signals 203, the prioritization logic 206 updates the priority 211 of the request 215 specified by the type-updating event signals 203. Thus, in the above example, if prefetch request 215 has a current priority 211 of 4'b0000 and the type-updating event signals 203 indicate the address specified in the request 215 has become the subject of a blocking request type, then the prioritization logic 206 updates the priority 211 to a value of 4'b1100.

Control logic 104 also includes bus request issue logic 208 coupled to request queue 202. In one embodiment, at a core clock 112 cycle prior to the next bus clock 114 cycle, bus request issue logic 208 selects the highest priority cache line fill request 215 stored in the request queue 202 and issues the selected request 215 on bus transaction request signal 116 to the bus interface unit 106 of FIG. 1. The bus interface unit 106 responsively issues the selected request 116 on the processor bus 118. The bus request issue logic 208 also removes the selected request 215 from the request queue 202. In one embodiment, other functional units within the microprocessor 100 also request the bus interface unit 106, which arbitrates between the bus request issue logic 208 and the other functional units for access to the processor bus 118, and the bus request issue logic 208 removes the selected request 215 only if the bus request issue logic 208 wins arbitration with the bus interface unit 106.

The prioritization logic 206 additionally updates the priority 211 of each of the requests 215 remaining after the bus request issue logic 208 issues a request 215 on the processor bus 118 and removes the request 215 from the request queue 202. In one embodiment, each time a request 215 is removed from the request queue 202, the prioritization logic 206 increments the priority 211 of each request 215 remaining in the request queue 202, i.e., each request 215 not selected for issuance on the processor bus 118.

Control logic 104 also includes round-robin state 205, coupled to the bus request issue logic 208. In one embodiment, the round-robin state 205 comprises a round-robin pointer that points to an entry 215 in the request queue 202. Each time a request 215 is issued on the processor bus 118, the round-robin pointer is incremented to the next entry 215 in the request queue 202. When the round-robin pointer reaches one end of the request queue 202 it wraps to the other end of the request queue 202. The round-robin pointer is used in the situation where more than one request 215 is the highest priority request to select among the highest priority requests in a fair manner, as described in more detail below.

Advantageously, raising the priority 211 of unselected requests 215 remaining in the request queue 202 in conjunction with selecting the highest priority requests 215 in round-robin order prevents a live-lock condition from occurring in which, in a pathological case, a request 215 might otherwise never be selected for issuance on the processor bus 118.

Figure 3:
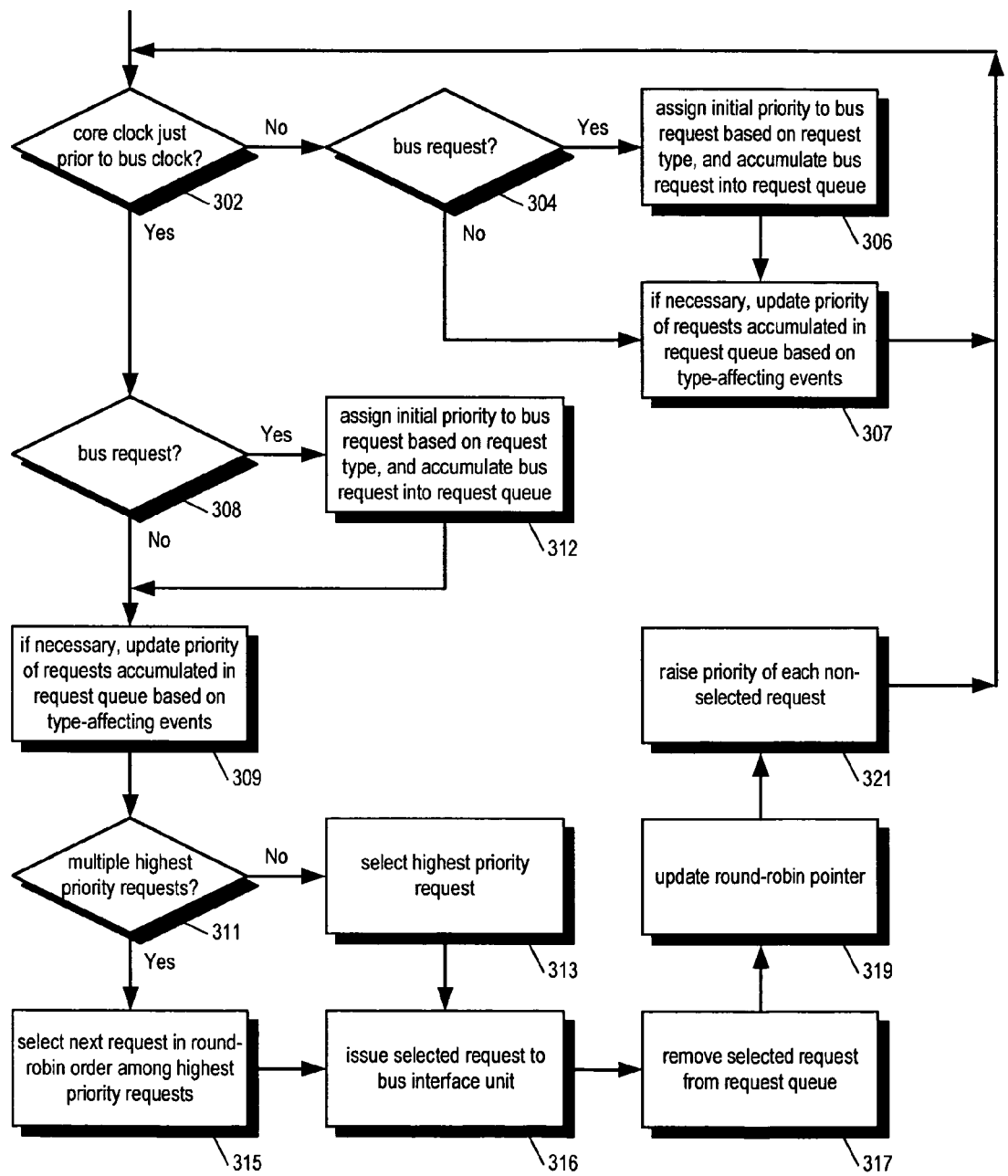
FIG. 3 is a flowchart illustrating operation of the microprocessor of FIG. 1 according to the present invention.

Referring now to FIG. 3, a flowchart illustrating operation of microprocessor 100 of FIG. 1 is shown. Flow begins at decision block 302.

At decision block 302, control logic 104 of FIG. 1 determines whether the current core clock 112 cycle is the core clock 112 cycle just prior to the next bus clock 114 cycle. If not, flow proceeds to decision block 304. Otherwise, flow proceeds to decision block 308.

At decision block 304, accumulation logic 204 of FIG. 2 determines whether data cache 102 is generating a cache line fill request on any of request signals 122-128 of FIG. 1. If not, flow proceeds to block 307. Otherwise, flow proceeds to block 306.

A block 306, accumulation logic 204 assigns an initial priority to any cache line fill requests on signals 122-128 based on its request type, according to Table 1 above, and accumulates each request into an entry 215 of the request queue 202, which includes populating the priority field 211 with the initially assigned priority, populating the address field 213 with the cache line address specified by the request, and setting the valid bit 217. Flow proceeds to block 307.

At block 307, if the type-updating event signals 203 indicate the need to, the prioritization logic 206 of FIG. 2 updates the priority 211 of each request 215 in the request queue 202 whose request type has changed. In one embodiment, the prioritization logic 206 only updates the priority 211 of a request 215 if the update would be an increase in the priority 211 of the request 215. Flow returns to decision block 302.

At decision block 308, accumulation logic 204 determines whether data cache 102 is generating a cache line fill request on any of request signals 122-128. If not, flow proceeds to block 309. Otherwise, flow proceeds to block 312.

A block 312, accumulation logic 204 assigns an initial priority to any cache line fill requests on signals 122-128 based on its request type, according to Table 1 above, and accumulates each request into an entry 215 of the request queue 202, which includes populating the priority field 211 with the initially assigned priority and populating the address field 213 with the cache line address specified by the request. Flow proceeds to block 309.

At block 309, if the type-updating event signals 203 indicate the need to, the prioritization logic 206 of FIG. 2 updates the priority 211 of each request 215 in the request queue 202 whose request type has changed. In one embodiment, the prioritization logic 206 only updates the priority 211 of a request 215 if the update would be an increase in the priority 211 of the request 215. Flow proceeds to decision block 311.

At decision block 311, the bus request issue logic 208 of FIG. 2 determines whether there are more than one highest priority requests 215 in request queue 202. If so, flow proceeds to block 315; otherwise, flow proceeds to block 313.

At block 313, bus request issue logic 208 selects the highest priority request 215 in request queue 202. Flow proceeds to block 316.

At block 315, bus request issue logic 208 selects the highest priority request 215 in request queue 202 indicated by the round-robin state 205 of FIG. 2. In one embodiment, if the priority 211 of the request 215 in the request queue 202 pointed at by the round-robin pointer is at least as high as the priority 211 of any other request 215 in the request queue 202, then the bus request issue logic 208 selects the request 215 pointed to by the round-robin pointer; otherwise, the bus request issue logic 208 selects the next request 215 in the request queue 202 after the request 215 pointed to by the round-robin pointer that has a priority at least as high as the priority 211 of any other request 215 in the request queue 202. Flow proceeds to block 316.

A block 316, bus request issue logic 208 of FIG. 2 generates a request on bus request signal 116 to BIU 106 of FIG. 1 based on the request 215 selected at block 313 or 315. Flow proceeds to block 317.

At block 317, bus request issue logic 208 of FIG. 2 removes the request 215 selected at block 313 or 315 from request queue 202. In one embodiment, the bus request issue logic 208 removes the request 215 selected at block 313 or 315 from request queue 202 by clearing the valid bit 217 of the request entry 215. Flow proceeds to block 319.

At block 319, the prioritization logic 206 updates the round-robin state 205 in response to the removal of a request 215 from the request queue 202. In one embodiment, updating the round-robin state 205 comprises incrementing the round-robin pointer. Flow proceeds to block 321.

At block 321, the prioritization logic 206 raises the priority 211 of each request 215 still remaining in request queue 202 after removal of the selected request during block 316. That is, the prioritization logic 206 raises the priority 211 of each request 215 in request queue 202 not selected during block 316. Flow returns to decision block 302 for operation during the next core clock 112 cycle. In one embodiment, the actions of blocks 317, 319 and 321 are performed on the next core clock 112 cycle.

Since the core clock 112 runs at a fixed ratio with the bus clock 114, it is only necessary to select requests accumulated in request queue 202 in the core clock 112 cycle immediately before bus request issue logic 208 generates a bus request 116 to initiate a transaction on processor bus 118. Therefore, to allow as many cache line fill requests as possible to accumulate in the request queue 202 for prioritization and selection, the present invention waits to select a request for issuance on the processor bus 118 until the latest core clock 112 cycle before the beginning of the bus clock 114 cycle in which a transaction on the processor bus 118 can be initiated.

Figure 4:
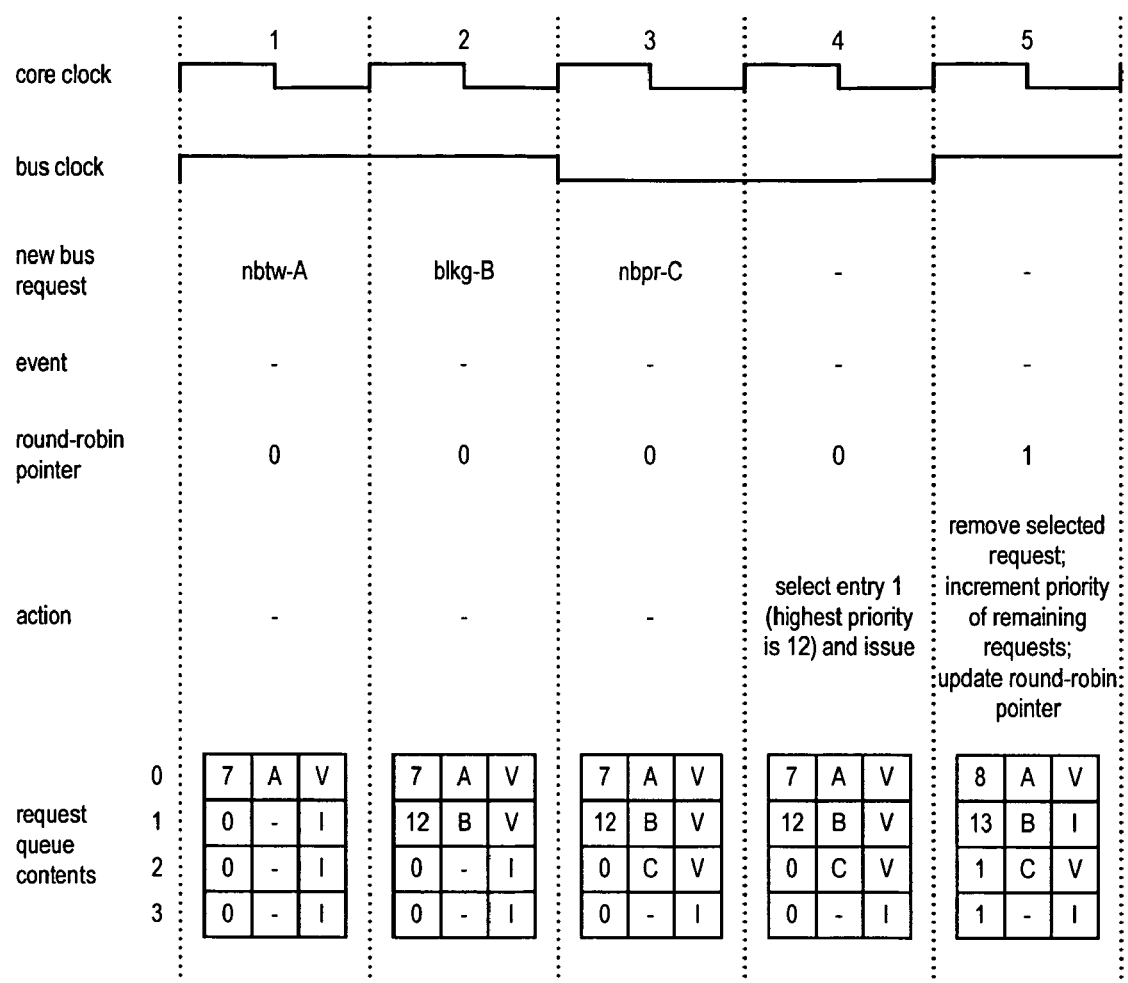
FIGS. 4 through 6 are timing diagrams illustrating operation of microprocessor of FIG. 1 according to the present invention.

Referring now to FIG. 4, a first timing diagram illustrating operation of microprocessor 100 of FIG. 1 is shown. The timing diagram shows an example of data cache 102 requesting cache line fills and of control logic 104 accumulating, selecting, and issuing the highest priority bus request according to the flowchart of FIG. 3. The timing diagram shows five core clock 112 cycles denoted 1 through 5, and one bus clock 114 cycle. In the example of FIG. 4, the clock multiplier value of microprocessor 100 is 4. That is, the core clock 112 frequency is 4 times the bus clock 114 frequency, as shown. The beginning of core clock cycle 1 coincides with the beginning of a bus clock cycle, as shown.

For each core clock cycle, the timing diagram shows whether a new request is being generated by data cache 102 on cache fill request signals 122-128 of FIG. 1. For each core clock cycle, the timing diagram also shows the contents of request queue 202 of FIG. 2. In the example of FIG. 4, the request queue 202 has four entries 215 denoted 0 through 3. Each entry 215 includes the priority 211 (shown as a decimal value), address 213 (e.g., A, B, C), and valid bit 217 (V denotes valid, I denotes invalid). A new request generated on non-blocking prefetch access signal 122 is denoted "nbpr-X," wherein X is an address. A new request generated on non-blocking store allocation access signal 124 is denoted "nbsa-X." A new request generated on non-blocking table walk access signal 126 is denoted "nbtw-X." A new request generated on blocking access signal 128 is denoted "blkg-X." Additionally, the timing diagram indicates whether an event has occurred on type-updating event signals 203 of FIG. 2. Also, the timing diagram indicates the value of the round-robin pointer of the round-robin state 205 of FIG. 2. Finally, the timing diagram indicates what action, if any, is taken each core clock cycle.

During core clock 1, data cache 102 generates a non-blocking table walk request to address A (nbtw-A) which accumulation logic 204 responsively stores into entry 0 and assigns an initial priority 211 of 7, according to Table 1 and block 306 of FIG. 3.

During core clock 2, data cache 102 generates a blocking request to address B (blkg-B), which accumulation logic 204 responsively stores into entry 1 and assigns an initial priority 211 of 12, according to Table 1 and block 306 of FIG. 3.

During core clock 3, data cache 102 generates a non-blocking prefetch request to address C (nbpr-C), which accumulation logic 204 responsively stores into entry 2 and assigns an initial priority 211 of 0, according to Table 1 and block 306 of FIG. 3.

During core clock 4, data cache 102 generates no new requests. Because core clock 4 is the core clock 112 cycle prior to the next bus clock 114 cycle as determined at decision block 302 of FIG. 3, the bus request issue logic 208 selects the request 215 of entry 1 because entry 1 has the highest priority valid request 215, according to block 313 of FIG. 3. Additionally, bus request issue logic 208 issues the selected request 215 in entry 1 to BIU 106, according to block 316 of FIG. 3.

During core clock 5, a new bus clock 114 cycle begins. Data cache 102 generates no new requests. However, bus request issue logic 208 removes the selected request 215 in entry 1 from the request queue 202, according to block 317 of FIG. 3. Additionally, bus request issue logic 208 updates the round-robin pointer by incrementing it to a value of 1, according to block 319 of FIG. 3. Finally, prioritization logic 206 raises the priority 211 of each request 215 in the request queue 202 by incrementing the priority 211, according to block 321 of FIG. 3. In one embodiment, the prioritization logic 206 increments the priority 211 of each request 215 in the request queue 202, which is consistent with block 321 since the selected request 215 in entry 1 is now invalid; thus, it is irrelevant that the priority 211 of entry 1 is increased.

Figure 5:
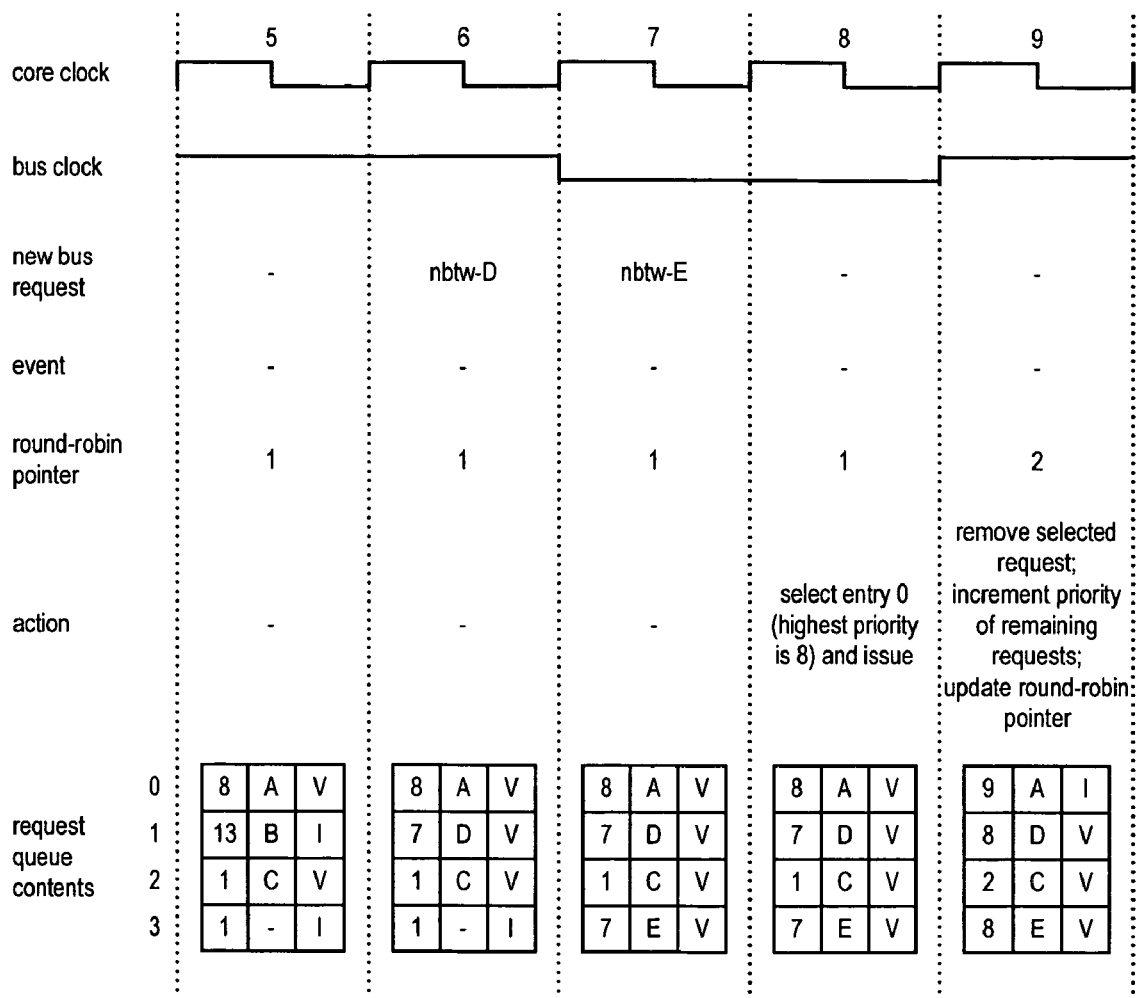

Referring now to FIG. 5, a second timing diagram illustrating operation of microprocessor 100 of FIG. 1 according to the flowchart of FIG. 3 is shown. The timing diagram of FIG. 5 shows five core clock cycles similar to FIG. 4; however, FIG. 5 shows clock cycles denoted 5 through 9. Core clock cycle 5 of FIG. 4 is repeated in FIG. 5.

During core clock 6, data cache 102 generates a non-blocking table walk request to address D (nbtw-D) which accumulation logic 204 responsively stores into entry 1 (the first available entry 215) and assigns an initial priority 211 of 7.

During core clock 7, data cache 102 generates a non-blocking table walk request to address E (nbtw-E) which accumulation logic 204 responsively stores into entry 3 (the first available entry 215) and assigns an initial priority 211 of 7.

During core clock 8, data cache 102 generates no new requests. Because core clock 8 is the core clock 112 cycle prior to the next bus clock 114 cycle as determined at decision block 302, the bus request issue logic 208 selects the request 215 of entry 0 because entry 0 has the highest priority valid request 215, according to block 313 of FIG. 3. Additionally, bus request issue logic 208 issues the selected request 215 in entry 0 to BIU 106, according to block 316 of FIG. 3.

During core clock 9, a new bus clock 114 cycle begins. Data cache 102 generates no new requests. However, bus request issue logic 208 removes the selected request 215 in entry 0 from the request queue 202, according to block 317. Additionally, bus request issue logic 208 updates the round-robin pointer by incrementing it to a value of 2, according to block 319. Finally, prioritization logic 206 raises the priority 211 of each request 215 in the request queue 202 by incrementing the priority 211, according to block 321 of FIG. 3.

Figure 6:
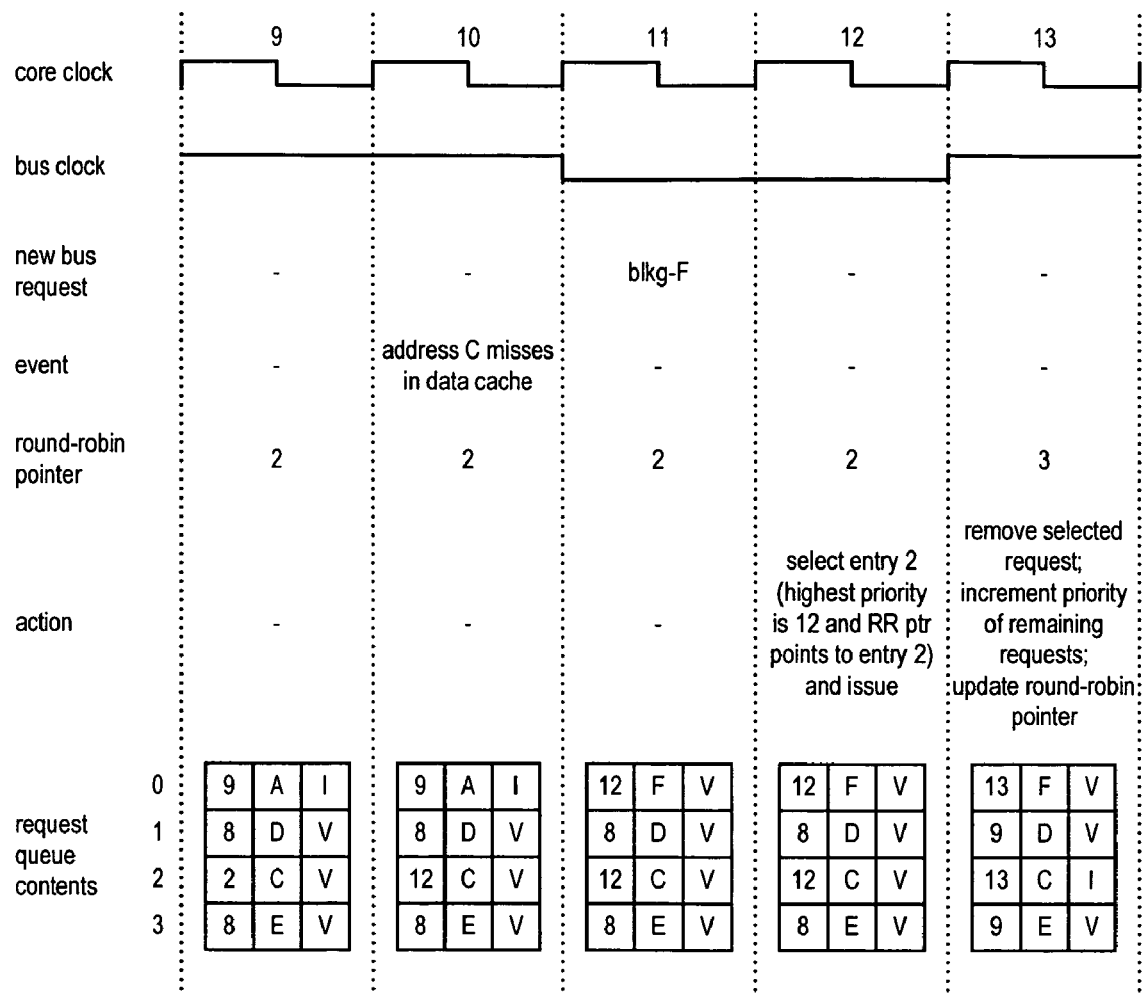

Referring now to FIG. 6, a third timing diagram illustrating operation of microprocessor 100 of FIG. 1 according to the flowchart of FIG. 3 is shown. The timing diagram of FIG. 6 shows five core clock cycles similar to FIG. 5; however, FIG. 6 shows clock cycles denoted 9 through 13. Core clock cycle 9 of FIG. 5 is repeated in FIG. 6.

During core clock 10, data cache 102 generates no new requests. However, address C misses in data cache 102 causing a stall in the microprocessor 100 pipeline, and the event is indicated on type-updating event signals 203. Consequently, prioritization logic 206 updates the priority 211 of entry 2 by assigning a priority of 12, according to Table 1 and block 307 of FIG. 3.

During core clock 11, data cache 102 generates a blocking request to address F (blkg-F) which accumulation logic 204 responsively stores into entry 0 (the first available entry 215) and assigns an initial priority 211 of 12.

During core clock 12, data cache 102 generates no new requests. Because core clock 12 is the core clock 112 cycle prior to the next bus clock 114 cycle as determined at decision block 302, the bus request issue logic 208 selects the request 215 of entry 2 because entry 2 is pointed to by the round-robin pointer and is at least the highest priority valid request 215, according to decision block 311 and block 315 of FIG. 3. Additionally, bus request issue logic 208 issues the selected request 215 in entry 2 to BIU 106, according to block 316.

During core clock 13, a new bus clock 114 cycle begins. Data cache 102 generates no new requests. However, bus request issue logic 208 removes the selected request 215 in entry 2 from the request queue 202, according to block 317. Additionally, bus request issue logic 208 updates the round-robin pointer by incrementing it to a value of 3, according to block 319. Finally, prioritization logic 206 raises the priority 211 of each request 215 in the request queue 202 by incrementing the priority 211, according to block 321.

Although the present invention and its objects, features, and advantages have been described in detail, other embodiments are encompassed by the invention. For example, although the present invention has been described as accumulating a single new cache line fill request per core clock cycle, multiple requests may be accumulated per core clock cycle, for example in a microprocessor with multiple functional units in the pipeline generating requests concurrently and/or in a multiple pipeline or superscalar processor. Also, although the present invention prioritizes requests according to three priority levels, the present invention is adaptable to different numbers of priority levels. Furthermore, the invention may be used with a processor bus whose protocol does not allow a new bus request to be generated each bus clock, but instead only allows a new bus request to be generated every N bus clocks. Additionally, although the present invention groups four access types into the various priority levels, other access types may be grouped according to the needs of the processor using the present invention. Finally, although the present invention accumulates bus requests and prioritizes them at the core clock just prior to the next bus clock edge, the bus requests could be prioritized some other integer multiple of core clocks, such as two or three, prior to the next bus clock edge.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for a microprocessor to request cache lines from a system memory on a bus coupling the microprocessor and system memory, the bus operating at a bus clock frequency and core logic of the microprocessor operating at a core clock frequency which is a multiple of the bus clock frequency, the method comprising:
   at the core clock frequency:
      receiving a plurality of bus requests and initially assigning a priority to each bus request based on a request type thereof; and
   at the bus clock frequency:
      selecting a highest priority one of the plurality of bus request for issuance on the bus; and
      raising the priority of each of the plurality of bus request other than the one of the plurality of requests selected for issuance on the bus.

2. The method of claim 1, wherein each of the plurality of bus requests comprises a request to fetch a cache line on the bus from the system memory into a cache memory of the microprocessor.

3. The method of claim 2, wherein the request type is one of a plurality of request types, wherein a first of the plurality of request types is a blocking request type, wherein at least a second of the plurality of request types is a non-blocking request type.

4. The method of claim 3, wherein the blocking request type comprises a request causing a pipeline stall in the microprocessor until the cache line is fetched from the system memory on the bus.

5. The method of claim 2, wherein said initially assigning a priority to each bus request based on a request type thereof comprises assigning a higher priority to bus requests of the blocking request type than the non-blocking request type.

6. The method of claim 5, wherein the at least a second non-blocking request type comprises a non-blocking prefetch type and a non-blocking table walk type, wherein said initially assigning a priority to each bus request based on a request type thereof comprises assigning a higher priority to bus requests of the blocking request type than the non-blocking table walk request type, and assigning a higher priority to bus requests of the non-blocking table walk request type than the non-blocking prefetch request type.

7. The method of claim 5, wherein the at least a second non-blocking request type comprises a non-blocking store allocation type and a non-blocking table walk type, wherein said initially assigning a priority to each bus request based on a request type thereof comprises assigning a higher priority to bus requests of the blocking request type than the non-blocking table walk request type, and assigning a higher priority to bus requests of the non-blocking table walk request type than the non-blocking store allocation request type.

8. The method of claim 1, wherein the non-blocking request type comprises a request not causing a pipeline stall in the microprocessor.

9. The method of claim 1, further comprising:
   accumulating said plurality of requests into a bus requests queue, at the core clock frequency.

10. The method of claim 9, further comprising:
   unaccumulating from the request queue the one of the plurality of requests selected for issuance on the bus, at the bus clock frequency, after said selecting.

11. The method of claim 1, wherein said selecting a highest priority one of the plurality of requests for issuance on the bus comprises selecting the highest priority one of the plurality of requests for issuance on the bus during a last core clock cycle of a bus clock cycle.

12. The method of claim 1, wherein said selecting a highest priority one of the plurality of requests for issuance on the bus comprises selecting the highest priority one of the plurality of requests for issuance on the bus during a core clock cycle just prior to a next bus clock cycle.

13. The method of claim 1, wherein if more than one of the plurality of requests is the highest priority, then said selecting a highest priority one of the plurality of requests for issuance on the bus comprises selecting one of the more than one highest priority request in a round-robin fashion.

14. The method of claim 1, further comprising:
determining whether an event has occurred that changes the request type of each of the plurality of requests to a different request type; and
updating the priority of each of the plurality of requests for which an event affecting the request type has occurred based on the different request type.

15. The method of claim 14, wherein said determining and updating are performed at the core clock frequency.

16. The method of claim 14, wherein said determining whether an event has occurred that changes the request type comprises determining that a non-blocking request type has become a blocking request type.

17. A method for a microprocessor to request cache lines from a system memory on a bus coupling the microprocessor and system memory, the bus operating at a bus clock frequency and core logic of the microprocessor operating at a core clock frequency which is a multiple of the bus clock frequency, the method comprising:
at the core clock frequency:
receiving a plurality of bus requests and initially assigning a priority to each bus request based on a request type thereof; and
at the bus clock frequency:
determining whether more than one of the plurality of bus requests is a highest priority;
if only one of the plurality of bus requests is the highest priority, selecting the highest priority one of the plurality of requests for issuance on the bus; and
if more than one of the plurality of bus requests is the highest priority, selecting in a round-robin fashion one of the more than one of the plurality of highest priority requests for issuance on the bus.

18. The method of claim 17, further comprising:
raising the priority of each of the plurality of bus requests other than the one of the plurality of bus requests selected for issuance on the bus.

19. The method of claim 18, wherein said raising is performed at the bus clock frequency.

20. The method of claim 17, further comprising:
determining whether an event has occurred that changes the request type of each of the plurality of bus requests to a different request type; and
updating the priority of each of the plurality of bus requests for which an event affecting the request type has occurred based on the different request type.

21. The method of claim 20, wherein said determining whether an event has occurred is performed at the core clock frequency.

22. A microprocessor, coupled to a bus for coupling to a system memory, the bus operating at a first clock frequency, the microprocessor having core logic operating at a second clock frequency, the second frequency being a multiple of the first frequency, comprising:
a data cache, configured to generate requests at the second frequency to read a cache line from the system memory on the bus, said requests each having a request type from among a plurality of predetermined request types, comprising a blocking request type and at least one non-blocking request type; and
control logic, coupled to said data cache, configured at the second frequency to accumulate said requests and to initially assign a priority to each of said accumulated requests based on said request type, and configured at the first frequency to select for issuance on the bus a highest priority one of said requests and to raise said priority of each of said non-selected accumulated requests, wherein said control logic is configured to initially assign said priority of a blocking type request to a first value and to assign said priority of a non-blocking type request to a second value, wherein said first value is higher priority than said second value.

23. The microprocessor of claim 22, wherein if more than one of said accumulated requests is highest priority, said control logic is configured to select in round-robin order one of said highest priority accumulated requests for issuance on the bus.

24. The microprocessor of claim 23, wherein said control logic comprises:
a request queue, wherein said control logic is configured to accumulate said requests into said request queue.

25. The microprocessor of claim 24, wherein said request queue comprises a plurality of entries for storing said requests, each of said plurality of entries comprising storage for storing said priority.

26. The microprocessor of claim 25, wherein said storage for storing said priority comprises at least four bits for representing at least sixteen priorities.

27. The microprocessor of claim 25, wherein said control logic comprises a round-robin pointer for pointing to one of said request queue plurality of entries for use in selecting in round-robin order one of said highest priority accumulated requests for issuance on the bus.

28. The microprocessor of claim 27, wherein said control logic updates said round-robin pointer each time one of said accumulated requests is removed from said request queue.

29. The microprocessor of claim 22, wherein said control logic is further configured to determine whether an event has occurred that changes said request type of each of said accumulated requests to a different request type, and to update said priority of each of said accumulated requests for which an event affecting said request type has occurred based on said different request type.

30. The microprocessor of claim 22, wherein said at least one non-blocking request type comprises a request to transfer page table data from the system memory to the microprocessor on the bus.

31. The microprocessor of claim 30, wherein said at least one non-blocking request type comprises a request to transfer a cache line associated with a store miss in said data cache from the system memory to the microprocessor on the bus, wherein said control logic is configured to initially assign said priority of a request to transfer page table data to said second value and to assign said priority of a request to transfer a cache line associated with a store miss to a third value, wherein said second value is higher priority than said third value.

32. The microprocessor of claim 30, wherein said at least one non-blocking request type comprises a request to prefetch a cache line from the system memory to the microprocessor on the bus, wherein said control logic is configured to initially assign said priority of a request to transfer page table data to said second value and to assign said priority of a request to prefetch a cache line from the system memory to the microprocessor on the bus to a third value, wherein said second value is higher priority than said third value.

33. The microprocessor of claim 22, wherein said at least one non-blocking request type comprises a request to transfer a cache line associated with a store miss in said data cache from the system memory to the microprocessor on the bus.

34. The microprocessor of claim 22, wherein said at least one non-blocking request type comprises a request to prefetch a cache line from the system memory to the microprocessor on the bus.

35. The microprocessor of claim 22, wherein the second frequency is at least twice the first frequency.

36. The microprocessor of claim 22, further comprising:
a bus interface unit, coupled to said control logic, configured to receive from said control logic said selected highest priority request, and to issue said selected highest priority request on the bus.

37. The microprocessor of claim 22, wherein said blocking request type is associated with a functional unit in the microprocessor requiring data specified by said blocking request type request in order to proceed.

38. The microprocessor of claim 22, wherein said blocking request type is associated with a request generated by an operation causing a pipeline stall in the microprocessor until data associated with said blocking request type request is fetched to the microprocessor from the system memory.

39. The microprocessor of claim 22, wherein said at least one non-blocking request type includes a non-blocking page table walk request type.

40. The microprocessor of claim 39, wherein said non-blocking page table walk request type comprises a request to read page table data from the system memory on the bus due to a translation lookaside buffer miss.

41. The microprocessor of claim 39, wherein said at least one non-blocking request type includes a non-blocking store allocation request type, wherein said control logic prioritizes non-blocking store allocation request type requests lower then said blocking request type requests and said non-blocking page table walk request type requests.

42. The microprocessor of claim 41, wherein said non-blocking store allocation request type comprises a request to read a cache line from the system memory on the bus due to a store miss in said data cache to a write-back memory region.

43. The microprocessor of claim 39, wherein said at least one non-blocking request type includes a prefetch request type, wherein said control logic prioritizes prefetch request type requests lower then said blocking request type requests and said non-blocking page table walk request type requests.

44. The microprocessor of claim 43, wherein said prefetch request type comprises a request to read a cache line specified by a prefetch instruction.

45. The microprocessor of claim 43, wherein said prefetch request type comprises a request to read a cache line speculatively generated by the microprocessor.

* * * * *